3,274,222
LEAD STABILIZERS FOR POLYVINYL CHLORIDE AND POLYVINYL CHLORIDE COPOLYMERS
Alfred Szczepanek, Duren-Rolsdorf, Germany, assignor to Firma Chemische Fabrik Hoesch K.-G.
No Drawing. Filed Dec. 28, 1961, Ser. No. 162,934
Claims priority, application Germany, Jan. 4, 1961, C 23,093
12 Claims. (Cl. 260—414)

The invention relates to lead stabilizers for polyvinyl chloride and polyvinyl chloride copolymers.

Halogen-containing synthetic resins, particularly polyvinyl chloride and copolymers of polyvinyl chloride and especially those used in electrical engineering are commonly mixed with inorganic or organic basic lead compounds which have a stabilizing action on the resins and are capable of binding hydrochloric acid split off. Characteristic of this group of lead stabilizers are tetrabasic lead sulfate, tribasic lead sulfate, dibasic lead phosphite and white lead on the inorganic side and dibasic lead stearate and dibasic lead phthalate on the organic side. Besides this group of basic lead stabilizers, use is also made of neutral lead salts such as lead stearate which, however, are chiefly employed as lubricants.

It has now been found that basic lead compounds the suspension of which in water has a pH value of 6 and more, when reacted with alkyl phenols in an aqueous medium, give reaction products which have an increased activity as stabilizers as compared with basic lead stabilizers alone.

Four different compounds were incorporated in polyvinyl chloride in four experiments and the compositions were tested for their thermal stability. In four comparative tests, the same lead compounds as those used in the first series of four tests were incorporated in polyvinyl chloride with the difference that these compounds had previously been contacted with alkyl phenol.

The compounds used in these tests included dibasic lead stearate, a basic complex salt of lead oxide, lead sulfate and lead stearate having the general formula $13PbO \cdot PbSO_4 \cdot 4Pb(C_{17}H_{35}COO)_2$, dibasic lead phosphite, and tetrabasic lead sulfate and the reaction products of these lead salts with p-tert. octyl phenol. These stabilizers were tested in a composition comprising 100 parts of suspension polyvinyl chloride (K-value, 70), 50 parts of dioctyl phthalate used as plasticizer and 2 parts of stabilizer. When using the inorganic basic lead salts, 1 part of E wax is added to facilitate the sheet formation on the roll mill.

The composition is first premixed in the order of polyvinyl chloride, stabilizer, E wax, dioctyl phthalate and then plasticized for 10 minutes at 170° C. on the roll mill. The composition is then attenuated to films of the same thickness which are tested for thermal stability by determining the time elapsing until hydrochloric acid appears at 200° C.

The test method used is a modification of German standard specification Deutsche Industries Norm No. 53,381, the deviation from the Deutsche Industries Norm specification comprising the use of an increased temperature to obtain a vigorous flow of hydrochloric acid upon cessation of the stability and the replacement of comminuted polyvinyl chloride by a sheet of the same surface area and thickness (0.4 x 5.0 x 5.0 cu. cm.) which is wound on itself and placed into the test tube. This modified method exhibits a substantially improved reproducibility as compared with that of the original method.

The results of the test are shown in the following table:

| Stabilizer: | Time in minutes until hydrochloric acid is detected |
|---|---|
| Dibasic lead stearate | 10 |
| Dibasic lead stearate reacted with p-tert. octyl phenol | 25 |
| Basic complex salt $13PbO \cdot PbSO_4 \cdot 4Pb(C_{17}H_{35}COO)_2$ | 11 |
| Basic complex salt $13PbO \cdot PbSO_4 \cdot 4Pb(C_{17}H_{35}COO)_2$ reacted with p-tert. octyl phenol | 33 |
| Dibasic lead phosphite | 18 |
| Dibasic lead phosphite reacted with p-tert. octyl phenol | 27 |
| Tetrabasic lead sulfate | 17 |
| Tetrabasic lead sulfate reacted with p-tert. octyl phenol | 24 |

It has not been cleared with certainty up to the present whether the lead stabilizers for polyvinyl chloride and copolymers of polyvinyl chloride are uniform chemical products or only mixtures. They can be prepared by contacting the basic lead compounds with alkyl phenols in an aqueous medium. Any basic inorganic and organic lead compound including basic lead complex salts having a pH value in excess of 6 in an aqueous suspension are capable of being reacted. Basic lead compounds which are suitable for the purposes of the invention include tetrabasic lead sulfate, tribasic lead sulfate, dibasic lead phosphite, monobasic lead phosphite, basic lead carbonate, dibasic lead stearate, dibasic lead phthalate, monobasic lead stearate, penta-basic lead salicylate, tribasic lead maleate as well as the basic complex salts which are the object of U.S. patent application Serial No. 629,461, now Patent No. 3,072,693.

Listed in the following table are the pH values of suspensions of $\frac{1}{100}$ mol of known basic lead stabilizers in water.

| Stabilizers | Chemical formula | pH |
|---|---|---|
| Tetrabasic lead sulfate | $4PbO \cdot PbSO_4$ | 8.5 |
| Tribasic lead sulfate | $3PbO \cdot PbSO_4$ | 7.7 |
| Dibasic lead phosphite | $2PbO \cdot PbHPO_3$ | 7.1 |
| White lead | $Pb(OH)_2 \cdot 2PbCO_3$ | 6.4 |
| Dibasic lead stearate | $2PbO \cdot Pb(C_{17}H_{35}COO)_2$ | 8.8 |
| Dibasic lead phthalate | $2PbO \cdot PbC_6H_4(COO)_2$ | 7.6 |

Suitable alkyl phenol components include mono- and polyalkylated phenols which are compatible with polyvinyl chloride and resistant to light and the phenol group of which is reactive, examples being p-tert. octyl phenol, p-tert. nonyl phenol, p-tert. dodecyl phenol, p,p'-isopropylidene diphenol, o-tert. butyl phenol, 2,4-dibutyl phenol, p,p'-secondary butylidene diphenol.

The lead stabilizers of the invention are prepared by suspending the reactants in sufficient water that a well stirrable dispersion is obtained which is then stirred for some time, e.g. 0.5 to 1 hour, at an elevated temperature of not more than 100° C. If the basic lead compounds used, e.g. dibasic lead stearate, are not wetted by water, it is recommended to operate in the presence of a wetting agent or of an organic solvent having a wetting action. The products obtained are generally in the form of powder. They are freed from excess alkyl phenol by washing with solvents and then dried and processed in a manner known per se.

The products obtained consist of a mixture of different compounds depending upon the relative proportions of the starting substances. The reaction upon solvents and the physical constants indicate that the alkyl phenols are not combined as lead phenolates since this can only be detected as a secondary constituent. It is probable that a complex salt is formed with formation of a new crystal lattice.

It is not critical for the use of the formed products as stabilizers of polyvinyl chloride whether they are uniform compounds or mixtures of substances. The relative proportions of basic lead salt and alkyl phenol are not established stoichiometrically but according to the most favorable behavior in the polyvinyl chloride composition. The products obtained by reacting basic lead salt with alkyl phenol in a ratio of 1 mol basic lead salt to 0.01–1 mol alkyl phenol have been found to be particularly favorable.

It is advantageous in many cases to coat only the surface of the basic lead compounds used with a layer of the resultant lead phenolate complex salt to obtain as economic a utilization of the alkyl phenol component as is possible.

The preparation of the lead complex salt mixtures is illustrated in the following examples in which p-tert. octyl phenol is used as the alkyl phenol component.

*Example 1.—Reaction between dibasic lead stearate and p-tert. octyl phenol*

61.05 gms. of dibasic lead stearate and 10.51 gms. of p-tert. octyl phenol are dispensed in 200 ml. of water to which 10 ml. of butanol is added. The dispersion is vigorously stirred for 0.5 hour while heating it to 95 to 100° C. The resultant white product is filtered and the filter cake is suspended twice in 300 ml. of methanol, decanted and filtered to remove unreacted octyl phenol. It is then dried at about 80° C. and subsequently ground.

Total and active Pb: 44.3%.
Density: 1.5.

*Example 2.—Reaction between a complex salt having the empirical formula $13PbO \cdot PbSO_4 \cdot 4Pb(C_{17}H_{35}COO)_2$ with p-tert. octyl phenol*

60.03 gms. of complex salt and 3.78 gms. of p-tert. octyl phenol are dispersed in 200 ml. of water to which 10 ml. of butanol is added and the dispersion is then stirred for 1 hour at 95 to 100° C. The white pulverulent product is processed as described in Example 1.

Pb active: 53.2%
Total Pb: 57.7%
Density: 1.7

*Example 3.—Reaction between dibasic lead phosphite and p-tert. octyl phenol*

74.26 gms. of dibasic lead phosphite and 37.86 gms. of p-tert. octyl phenol are dispersed with 5 ml. of butanol in 300 ml. of water and the dispersion is stirred for 1 hour at a temperature of 95° to 100° C. The resultant white pulverulent product is processed as described in Example 1.

Active and total Pb: 59.4%.
Density: 2.3.

*Example 4.—Reaction between tetrabasic lead sulfate and p-tert. octyl phenol*

59.8 gms. of tetrabasic lead sulfate and 18.92 gms. of p-tert. octyl phenol are dispersed with 5 ml. of butanol in 200 ml. of water and the dispersion is stirred for 0.5 hour at a temperature of 95° to 100° C. The resultant white pulverulent product is processed as described in Example 1.

Pb active: 52%
Total Pb: 66.9%
Density: 2.3

What is claimed is:

1. A lead stabilizer for polyvinyl chloride and copolymers of polyvinyl chloride, obtained by reacting a basic lead salt which, in an aqueous suspension, has a pH value in excess of 6 with p-tert. octyl phenol, p-tert. nonyl phenol, p-tert. dodecyl phenol, o-tert. butyl phenol, 2,4-dibutyl phenol, and p,p'-secondary butylidene diphenol, in an aqueous medium at an elevated temperature.

2. A lead stabilizer according to claim 1, wherein the basic lead salt is a complex.

3. A lead stabilizer according to claim 1, wherein the basic lead salt is a basic lead sulfate.

4. A lead stabilizer according to claim 1, wherein the basic lead salt is a basic lead phosphite.

5. A lead stabilizer according to claim 1, wherein the basic lead salt is a basic lead carbonate.

6. A lead stabilizer according to claim 1, wherein the basic lead salt is a basic lead salt of an organic acid.

7. A lead stabilizer according to claim 1, obtained by reacting a basic lead salt with p-tert. octyl phenol.

8. A lead stabilizer for polyvinyl chloride and copolymers of polyvinyl chloride, obtained by reacting a basic lead salt which, in an aqueous suspension, has a pH value in excess of 6 with p-tert. octyl phenol, p-tert. nonyl phenol, p-tert. dodecyl phenol, o-tert. butyl phenol, 2,4-dibutyl phenol, and p,p'-secondary butylidene diphenol, in an aqueous medium at an elevated temperature and with the addition of an organic solvent having a wetting action.

9. A lead stabilizer for polyvinyl chloride and copolymers of polyvinyl chloride, obtained by reacting a basic lead salt which, in an aqueous suspension has a pH value in excess of 6 with p-tert. octyl phenol, p-tert. nonyl phenol, p-tert. dodecyl phenol, o-tert. butyl phenol, 2,4-dibutyl phenol, and p,p'-secondary butylidene diphenol, in an aqueous medium at an elevated temperature and in the presence of a wetting agent.

10. A lead stabilizer according to claim 1, obtained by reacting the basic lead salt with the phenol in a molar ratio of 1 mol basic lead salt to 0.01 to 1 mol alkyl phenol.

11. A lead stabilizer according to claim 1, wherein the basic lead salt is selected from the group consisting of: tetrabasic lead sulfate, tribasic lead sulfate, dibasic lead phosphite, monobasic lead phosphite, basic lead carbonate, dibasic lead stearate, dibasic lead phthalate, monobasic lead stearate, tetrabasic lead salicylate, tribasic lead maleate; and $13PbO \cdot PbSO_4 \cdot 4Pb(C_{17}H_{35}COO)_2$.

12. A lead stabilizer according to claim 11, the stabilizer being obtained by reacting said basic lead salt and said alkyl phenol in the proportion of 1 mol basic lead salt to 0.01–1 mol of alkyl phenol.

References Cited by the Examiner

UNITED STATES PATENTS

| | | | |
|---|---|---|---|
| 2,226,391 | 12/1940 | Rubenstein | 260—435 |
| 2,481,307 | 9/1949 | Garner et al. | 260—45.75 |
| 2,630,419 | 3/1953 | Wakefield et al. | 260—435 |
| 2,974,171 | 3/1961 | Coffield | 260—591 |
| 3,055,846 | 9/1962 | Flack et al. | 260—2.5 |

FOREIGN PATENTS 841,328  7/1960  Great Britain.

TOBIAS E. LEVOW, *Primary Examiner.*

LEON J. BERCOVITZ, *Examiner.*

E. C. BARTLETT, G. W. RAUCHFUSS,
H. M. S. SNEED, *Assistant Examiners.*